C. BLUM.
TORPEDO.
APPLICATION FILED MAY 22, 1917.
1,382,166.
Patented June 21, 1921.
2 SHEETS—SHEET 1.
FIG. I.
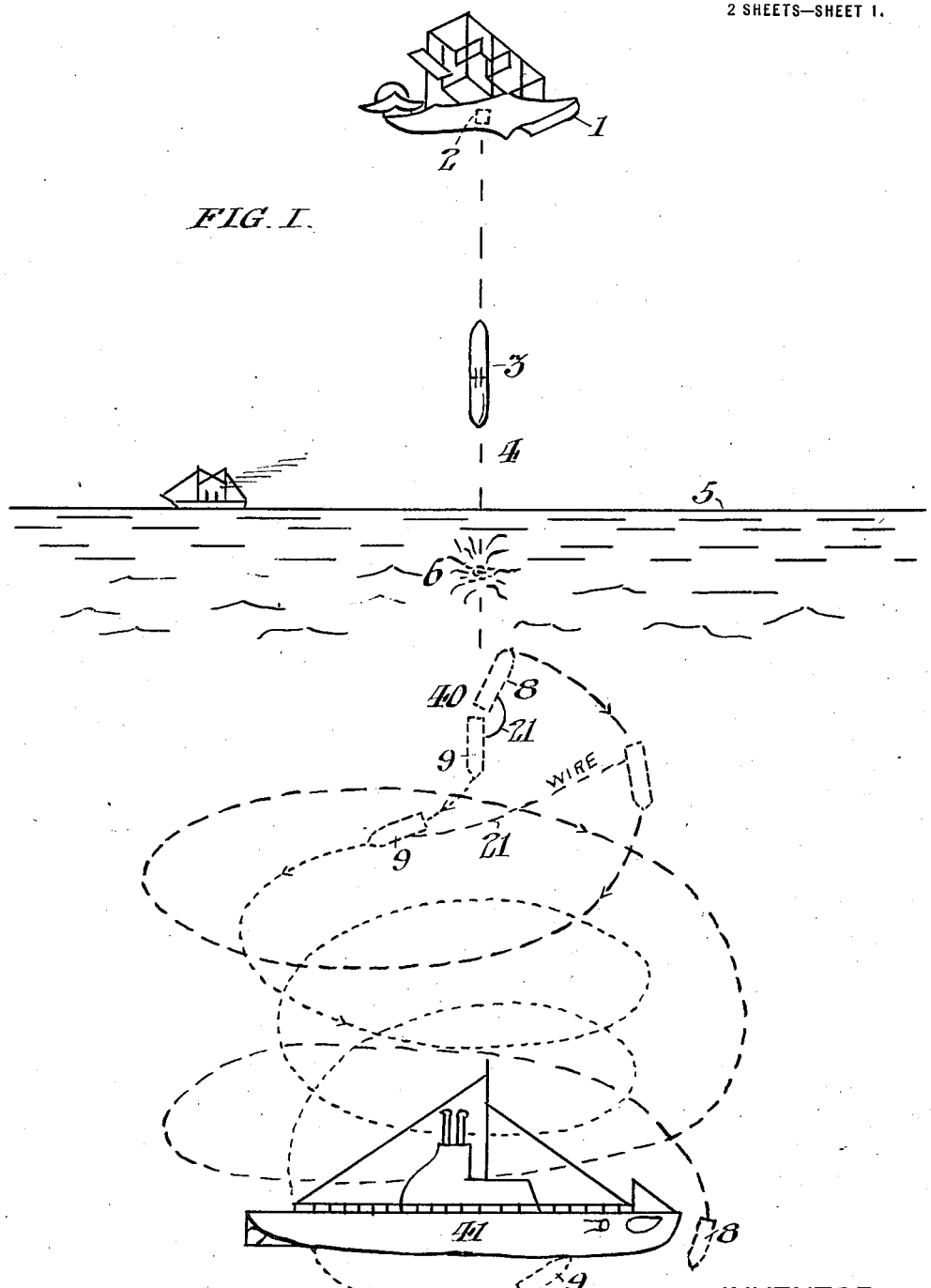
INVENTOR:
Charles Blum,
by Arthur E. Paige,
Attorney.

C. BLUM.
TORPEDO.
APPLICATION FILED MAY 22, 1917.
1,382,166.
Patented June 21, 1921.
2 SHEETS—SHEET 2.
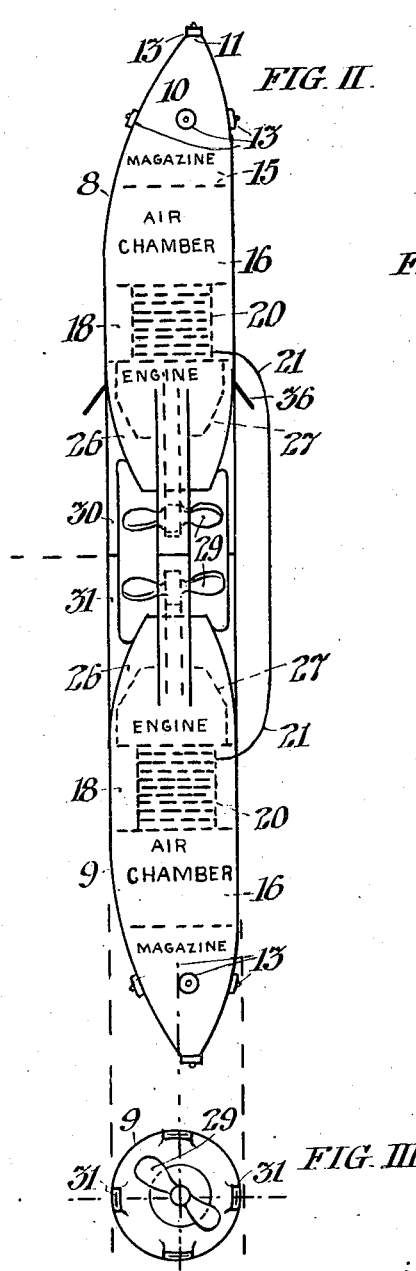
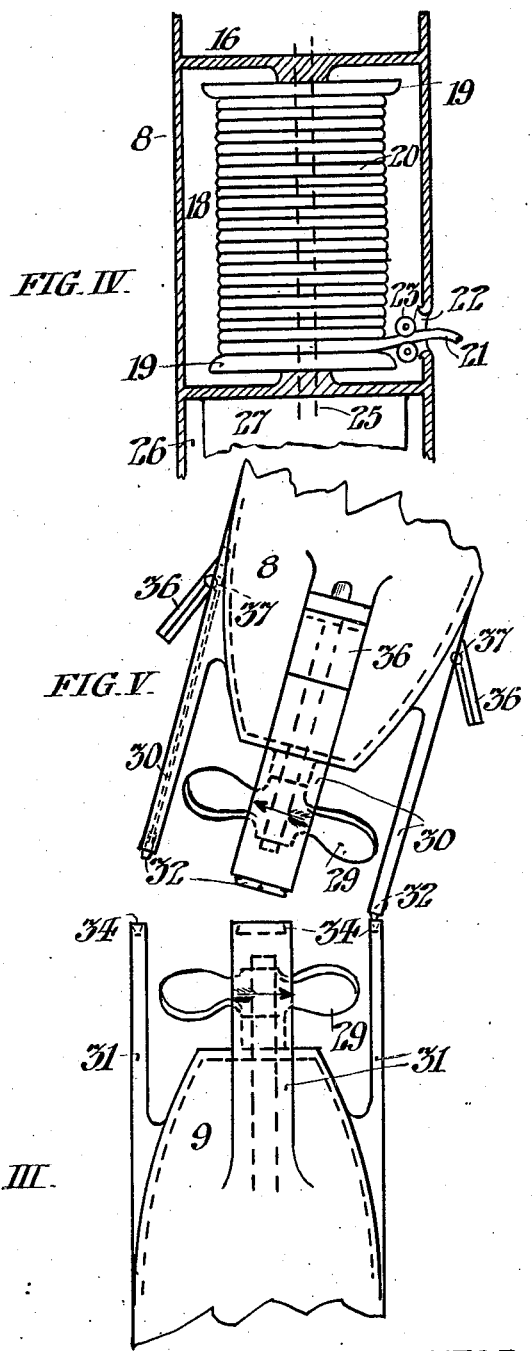
INVENTOR:
Charles Blum,
by Arthur E. Paige,
Attorney.

UNITED STATES PATENT OFFICE.

CHARLES BLUM, OF PHILADELPHIA, PENNSYLVANIA.

TORPEDO.

1,382,166.  Specification of Letters Patent.   Patented June 21, 1921.

Application filed May 22, 1917. Serial No. 170,138.

*To all whom it may concern:*

Be it known that I, CHARLES BLUM, a citizen of the United States, residing at Philadelphia, in the county of Philadelphia and State of Pennsylvania, have invented a certain new and useful Improvement in Torpedoes, whereof the following is a specification, reference being had to the accompanying drawings.
My invention is designed to destroy submarine vessels. It is the present practice to use aircraft of the type known as seaplanes to locate such vessels and to then rely upon the coöperation of marine surface vessels of the destroyer type to attack the submarine vessels pursuant to the information furnished by the seaplanes. My invention is designed to provide the seaplanes with means to directly attack submarine vessels without the loss of time, and opportunity for such vessels to escape which are incident to the attempted coöperation of the seaplanes with surface marine vessels.

As hereinafter described, my invention includes a torpedo structure of ultimately separable sections, which may, however, be dropped from aircraft as a unit. Torpedoes constructed in accordance with my invention may be, suspended, released and thus launched from aircraft by the means with which seaplanes are now ordinarily provided for dropping bombs. However, it is to be noted that whereas a bomb must be accurately dropped upon the object which it is to disrupt, and is necessarily of such shape and construction that it does not descend through water in alinement with its path through air, but has a tendency to drift and thus be deflected by marine currents; my improved torpedo is adapted to penetrate water in alinement with its path through the air, and, does not need to be accurately placed with respect to the vessel it is to disrupt, for the reason that it has a considerable area of effective operation after it reaches the water.

As hereinafter described, my invention includes a primarily rigidly connected pair of torpedoes respectively provided with marine propellers and so constructed and arranged that they automatically separate after they strike the water and are thereafter individually self propelled but remain coupled by a flexible connector such as a wire or cable having its opposite ends primarily coiled in the respective torpedo bodies but capable of unwinding, as the torpedoes are propelled, so as to extend said connector tautly between them and limit their relative movement to a descending evolute but substantially concentric spiral convolutions, until they explode.

Each of said torpedoes may include means to effect its explosion, under any of four distinct conditions, to wit, first, when the torpedo strikes a sufficiently resistant object, second, when the torpedo reaches a predetermined depth in the water, third, after a predetermined time from the instant it strikes the water, and, fourth, when its propeller ceases to turn. My invention includes the various novel features of construction and arrangement hereinafter more definitely specified.

However, I do not desire to limit myself to the use of my invention in attacks upon self propelled submarine vessels, as it may be used in sweeping mine fields of mines which are either free floating or anchored, and may also be used to attack surface marine vessels.

In said drawings; Figure I is a diagrammatic view, partly in air elevation and water section, illustrating the use of my invention as launched from a seaplane in an attack upon a submerged submarine.

Fig. II is an elevation on a larger scale showing a sectional torpedo structure of the type indicated in Fig. I, including a separable but primarily rigidly connected pair of torpedoes.

Fig. III is a plan view of the upper end of the lower one of the pair of torpedoes indicated in Fig. II.

Fig. IV is a fragmentary sectional view of one of the torpedo casings, indicated in Fig. II, showing the rotatable reel upon which is coiled one end of the flexible connector by which the pair of torpedoes is coupled.

Fig. V is a fragmentary side elevation, showing the contiguous ends of the two torpedoes indicated in Fig. II, but on a larger scale, and indicating the means by which they are primarily rigidly connected and ultimately separated.

Referring to Fig. I; 1 indicates an aircraft, conveniently of the seaplane type, including a manually controllable device 2 adapted to suspend and release, at the will of the aeronaut, the torpedo structure 3 as a unit; so that the latter gravitates in the path indicated by the dash line 4 through the air above the level of the water 5 and after it penetrates the latter to a point 6, below said surface 5, where disengagement and separation of the sections of the torpedo structure 3 is finally effected consequent upon its initial contact with the water.

Referring to Fig. II, it is to be understood that said unitary structure 3 indicated in Fig. I includes the pair of torpedo shells 8 and 9, which are substantially similar in that each has at its end 10 which is designed to be its bow in its self propelled course in the water, a point 11 in permanent rigid relation therewith and in eccentric relation to its body, so as to compel the entire torpedo to traverse a curved course instead of a straight line like an ordinary self propelled torpedo.

The fore ends 10 of said torpedo shells 8 and 9 are provided with five percussion exploders 13 one of which is at the point 11 and the others in a series extending transversely with respect to the axis of the torpedo shell, which is substantially circular in cross section throughout its length. Said exploders may be of any suitable form or construction and are respectively in communication with a magazine of explosives in the fore compartment 15 of the respective torpedo.

Immediately aft of the explosive magazines, each of said torpedo shells 8 and 9 includes a chamber 16 inclosing a sufficient supply of compressed air to effect the propulsion of the torpedo. Said air chambers may include, or have in connection therewith, means for heating the supply of air as the latter becomes exhausted, to partially compensate the tendency to diminishment of air pressure. Such means may be of any ordinary construction.

Aft of said air chamber, in each of said torpedo shells 8 and 9 is a chamber 18 containing a rotatable reel 19 carrying in a coil 20 one end of a flexible connector 21, which may be a wire or cable, which may be freely withdrawn through the port 22 in the side of said shell; its passage being facilitated by suitable rollers 23. However, it is to be understood that the extreme ends of said connector 21 are respectively permanently secured to the respective reels 19 so that said torpedo bodies 8 and 9 remain permanently coupled regardless of the increase in distance between them as the connector 21 unwinds.

Although the two reels 19 aforesaid are similarly constructed and arranged, as above described, it is to be understood that the one in the initially lower torpedo body 9 has a capacity greater than the initially upper one 8 and that said two reels have proportionate amounts of flexible connector coiled thereon; so as to insure substantial preponderance of weight below the center of gravity of the entire torpedo structure 3 and consequent vertical gravitation of the same until said two torpedo bodies 8 and 9 are separated. Said reels 19 are conveniently mounted to rotate upon respective tubes 25 which extend through said chambers 18 from the air chambers 16 to the engine chambers 26 and serve as conduits for the compressed air to the latter.

Each of said compartments 26, respectively in the after bodies of the torpedo shells 8 and 9, incloses an engine 27 adapted to be automatically operated by compressed air and operatively connected by a shaft 28 with a rotary screw propeller 29, which may be of any suitable construction. However, it is to be noted that said propellers are respectively rotated in the directions indicated by the arrows marked thereon in Fig. V so that their action tends to separate said torpedo bodies 8 and 9.

Said torpedo bodies 8 and 9 are respectively provided, at the stern, with a circumferential series of tail blades 30 and 31 which serve as stationary rudders directing the traverse of the respective torpedoes and preventing entanglement of the propellers 29. Said blades 30 and 31 are primarily registered as indicated in Fig. II and are conveniently a part of the means for primarily rigidly connecting said shells in separable relation; by means of slide bolts 32 which are mounted to slide in said blades 30 but normally extend therefrom in engagement with the sockets 34 in said blades 31. Each of said bolts 32 has at its upper end a fin 36 which is hinged thereto at 37 forming a knuckle joint which permits said fins 36 to fold flat in accordance with the stream lines of said torpedo 8 when the latter is progressed by its propeller but which normally project as indicated in Figs. II and IV so that when they first strike the water they slide said bolts 32 toward the pointed end 10 of the shell 8 to disengage the latter from the shell 9. As indicated in Fig. V; said shells 8 and 9 tend to turn out of alinement with each other as they separate, because they are coupled upon one side only by the flexible connector 21.

It is to be understood that the construction and arrangement above described is such that after said torpedo bodies 8 and 9 separate as indicated in Fig. V and as also indicated at 40 in Fig. I; they are individually independently propelled in different descending evolutes but substantially concentric spiral convolutions with the connector 21 being rapidly drawn out between them so as to form an entanglement throughout a space which is of considerable dimensions both vertically and laterally, the extent of the space swept being substantially predetermined, by the capacity of the air chambers 16, the speed and duration of operation of the propellers 29, and the length of the flexible connectors 21. As said torpedoes 8 and 9 are progressed in opposite directions with the connector 21 extending between them they tend to wrap the latter around any object which it encounters offering sufficient resistance; and, of course, if that object is a submarine vessel 41 the explosion of said torpedoes, under any of the conditions predetermined for such explosion as above contemplated, disrupts the entangled vessel.

Although I have described my invention with reference to the ordinary means of propelling torpedoes, to wit, by compressed air engines; it is to be understood that a torpedo structure formed of primarily connected but separable sections in accordance with my invention, may be propelled by any other suitable means. For instance, such sections may be provided with individual electric motors either automatically operative or operative under control by any suitable means. In this connection, I note that suitable electric motors may be controlled by wireless impulses.

Therefore, it is to be understood that I do not desire to limit myself to the specific details of construction and arrangement herein set forth, as it is obvious that various modifications may be made therein without departing from the essential features of my invention as defined in the appended claims.

I claim:

1. A torpedo structure of ultimately separable sections, primarily connected as a unit, each section including self-propelling means constructed and arranged to operate after said sections are separated.

2. A primarily connected pair of torpedoes having a flexible connector extensible between them and means for effecting their separation, each torpedo including self-propelling means constructed and arranged to operate after said sections are separated.

3. A primarily rigidly connected pair of torpedoes, respectively provided with marine propellers; means whereby they are automatically separated and means to independently actuate said propellers.

4. A primarily rigidly connected pair of torpedoes, respectively provided with marine propellers; means whereby they are automatically separated; means to independently actuate said propellers; a flexible connector extending between said torpedoes and primarily coiled at its respective ends therein but capable of uncoiling as the torpedoes are propelled so as to connect them regardless of their extent of separation, to the limit of said connector.

5. A torpedo structure including two independently movable sections; a flexible connector between said sections; means arranged to rigidly connect said sections in separable relation; and means carried by each of said sections, arranged to propel it independently of the other section.

6. A torpedo structure including two complementary sections each having a rotary propeller and means to rotate it independently of the other section; and a flexible connector between said sections.

7. A torpedo structure including two independent sections; a flexible connector between such sections; each of said sections having a rotary propeller and means to rotate it independently of the other section; and each of said sections having its fore end pointed eccentrically with respect to its body; whereby each of said sections is continuously deflected from a straight course when freely propelled.

In testimony whereof, I have hereunto signed my name at Philadelphia, Pennsylvania, this twenty-first day of May, 1917.

CHARLES BLUM.

Witnesses:
ARTHUR E. PAIGE,
FRANK E. PAIGE.